July 31, 1962
D. C. ROWE
3,047,710
APPARATUS FOR BRAZING AND HEAT TREATING
HONEYCOMB SANDWICH STRUCTURES
Original Filed Oct. 24, 1958
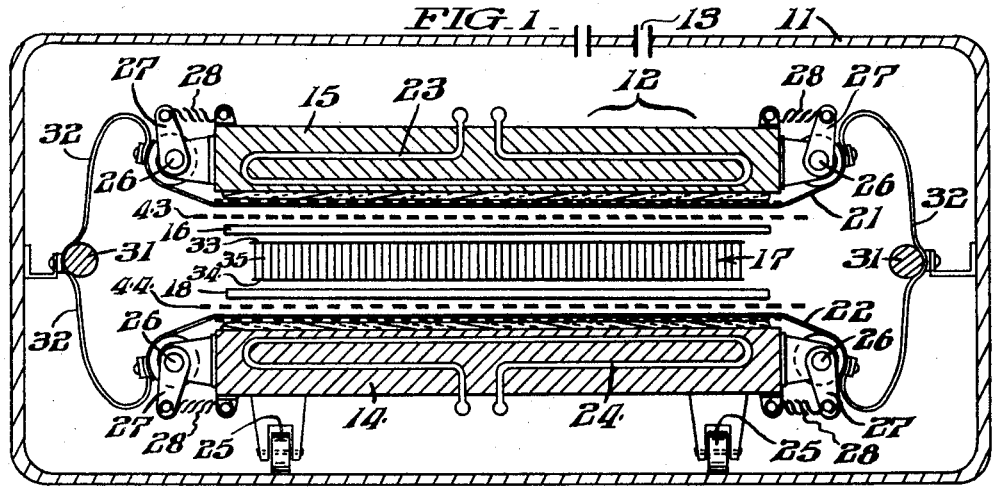
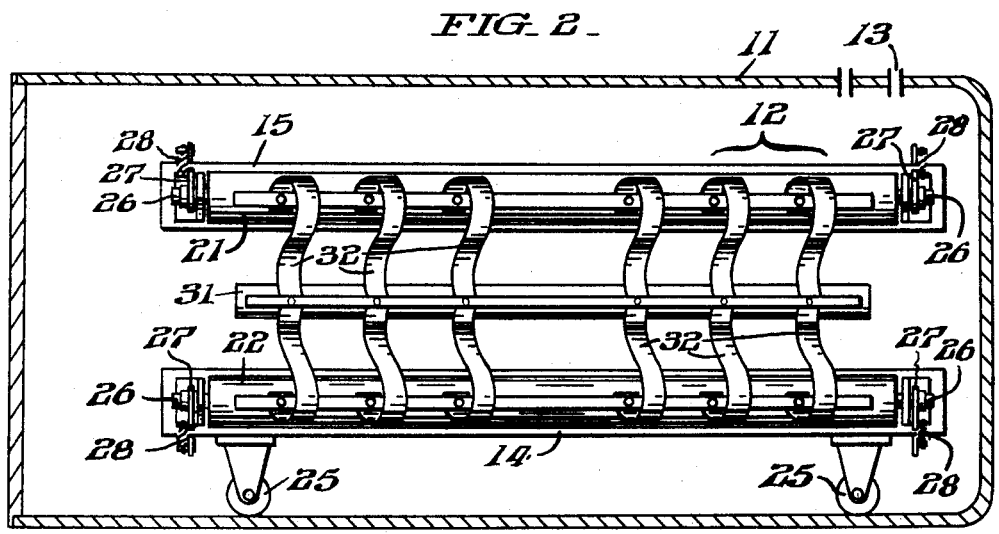
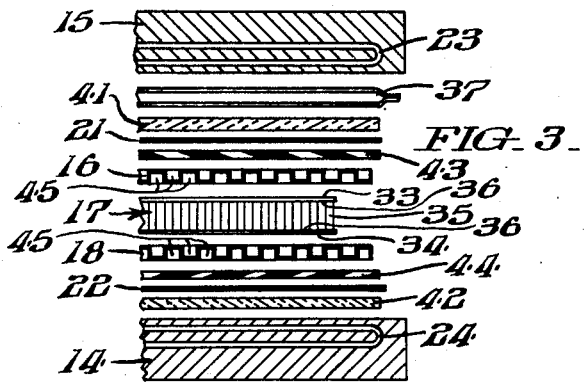
DONALD C. ROWE
INVENTOR.
BY Paul & Paul
ATTORNEYS United States Patent Office 3,047,710
Patented July 31, 1962

3,047,710
APPARATUS FOR BRAZING AND HEAT TREATING HONEYCOMB SANDWICH STRUCTURES
Donald C. Rowe, Glen Mills, Pa., assignor, by mesne assignments, to Boeing Airplane Company, Seattle, Wash., a corporation of Delaware
Original application Oct. 24, 1958, Ser. No. 769,449, now Patent No. 3,011,926, dated Dec. 5, 1961. Divided and this application Sept. 29, 1960, Ser. No. 59,276
3 Claims. (Cl. 219—85)

This application is a division of an application filed by me on October 24, 1958, Serial No. 769,449 entitled "Method and Apparatus for Brazing and Heat Treating Honeycomb Sandwich Structures" and now Patent No. 3,011,926, issued December 5, 1961.

This invention relates to improvements in brazing and heat treating, and more particularly concerns apparatus for brazing and heat treating honeycomb sandwich structures.

High speed aircraft require structural material capable of withstanding elevated skin temperatures. To withstand these temperatures, use has been made of stainless steel honeycomb sandwich structures.

However, the economical manufacturing of such honeycomb structures has presented many problems. Many of the current production methods are costly and difficult to control. According to one heretofore proposed method, the elements of the honeycomb sandwich structure are placed on a graphite block, and various cover sheets are placed thereon in an individually formed retort, with the top sheet exerting pressure on the elements by the use of a partial vacuum. The retort is then sealed by welding the top sheet in place, after which the retort is purged of impurities by flooding it with argon. Then the retort is loaded into furnace which is also flooded with argon to compensate for possible leaks in the retort welding.

After the retort and its contents have been subjected to the brazing and heat treating cycle, it is removed from the furnace and inserted in a refrigerated box for deep freezing, after which the brazed sandwich structure is aged, either with or without its supporting retort.

The capital expense is large, primarily because of the cost of furnaces of such large capacity so as to be able to contain and heat both the brazed sandwich and its enclosing fixture and retort in a controlled atmosphere. Further, additional furnaces are required for the post-ageing treatment.

Fixturing costs for the furnace brazed method are expensive in the cost of the graphite material, in the assembly of many graphite blocks into a single fixture in a manner that does not allow distortion with heat, in the machining of the bolted graphite asesmbly, in the manufacture of the retorts, in the welding of each sandwich structure into an individual retort, and in the relatively frequent replacement required of the retorts and the graphite fixtures.

Processing costs for the furnace braze method are also expensive. The inert gas (argon) is not reclaimable, and close control of moisture and oxygen content is required. The costs of monitoring the purity of the gas is an expense in addition to the production costs. Processing is also expensive in terms of the energy required to first heat, then cool, and then heat again the large mass of the combined retort and graphite fixture.

Control difficulties are present in the furnace braze method due to: (1) the distorting of the fixture and retort under heat and pressure; (2) the necessity of maintaining the purity and moisture content of the argon; and (3) the necessity of achieving and maintaining uniform temperature in the furnace, and through the retort and fixture to the sandwich structure.

Accordingly, it is an object of this invention to overcome the problems hereinbefore mentioned.

It is another object of this invention to provide apparatus for brazing and heat treating honeycomb sandwich structure, which invention includes self-contained heating means.

It is another object of this invention to eliminate impurities in the atmosphere surrounding the brazing and heat treating operation.

It is another object of this invention to provide means whereby the honeycomb sandwich structures may be made on a mass production basis.

It is another object of this invention to provide means for rapidly cooling the sandwich structure from brazing temperature to a sub-zero temperature, and for performing the aging portion of the heat treating cycle without removing the sandwich structure from the apparatus of the invention.

It is another object to produce a sandwich structure having the best properties of the materials being brazed.

Other objects and advantages of this invention, including its simplicity and economy, will further become apparent hereinafter and in the drawings, in which:

FIG. 1 is a view in front elevation and partly in cross section of apparatus constructed in accordance with this invention;

FIG. 2 is a view in side elevation and partly in section of the apparatus of FIG. 1; and FIG. 3 is an exploded view of the elements of the apparatus of FIG. 1, and is drawn on an enlarged scale in order to bring out important details.

Although specific terms are used in the following description for clarity, these terms are intended to refer only to the structure shown in the drawings and are not intended to define or limit the scope of the invention.

Turning now to the specific embodiment of the invention selected for illustration in the drawings, there is shown apparatus for brazing and heat treating honeycomb sandwich structure, which apparatus includes an enclosure 11 and a brazing fixture 12.

Enclosure 11 is adapted to contain a gas such as air and is sealable to form a vacuum chamber. A conduit 13 is provided for evacuating the gas from the vacuum chamber of enclosure 11.

Brazing fixture 12 includes a bottom fixture plate 14, a top fixture plate 15, a top caul or cooling plate 16 positioned below top fixture plate 15 and above the honeycomb sandwich structure 17, a bottom caul or cooling plate 18 positioned between sandwich structure 17 and bottom fixture plate 14, upper heating strips 21, and lower heating strips 22.

Top fixture plate 15 is provided with a conduit 23 through which a cooling liquid or refrigerant may flow, and similarly, bottom fixture plate 14 is provided with a conduit 24. Bottom fixture plate 14 is mounted on wheels 25 which provide for easily moving the brazing fixture 12 into and out of enclosure 11.

Heating strips 21 and 22 are mounted on shafts 26, and the strips 21, 22 are kept taut through the action of arms 27 which are mounted on shafts 26, and springs 28 which are connected to arms 27 and serve to pull heating strips 21 and 22 taut. Electrical energy is supplied to heating strips 21, 22 from the bus bars 31 which are connected to the strips 21, 22 by the electrical cables 32. Bus bars 31 are connected to a source of electrical power (not shown). Honeycomb sandwich structure 17 includes a pair of faces 33, 34 with a honeycomb core 35 positioned therebetween with braze material 36 located between honeycomb core 35 and the faces 33, 34. Faces 33, 34 are preferably of stainless steel, honeycomb core 35 is preferably .0015 inch foil, one-quarter inch square cell spot welded stainless steel, and braze material 36 is preferably 92.5 percent silver, 7.3 percent copper, .2 percent lithium (the Handy and Harmon silver braze). Braze material 36 need not be a sheet of material, but may instead be sprayed on the brazing areas if desired.

Referring to FIG. 3, also positioned between fixture plates 14 and 15 are a stainless steel pressure bag 37, thermal insulation blankets 41, 42, and electrical-insulation separators 43, 44. Heating elements 21, 22 are preferably made of Nichrome, and separators 43, 44 are preferably made of fibrous silica. Caul plates 16 and 18 have formed therein the passages 45 through which coolant may flow to provide for integral cooling. For clarity purposes, the structure holding the fixture plates 14 and 15 in fixed relation to each other has not been shown. Any type of holding structure may be employed. Examples of such are shown on page 158 of The American Machinist of March 25, 1957, and Figure 26 of The American Society for Metals (Los Angeles Chapter) publication of Lecture No. 3 (November 7, 1955).

In the method of the present invention, a stainless steel honeycomb sandwich structure 17 is assembled together by taking the thin stainless steel faces 33, 34, the honeycomb core 35, and the braze material 36 and tack brazing the elements together. Then sandwich structure 17 is placed on top of bottom fixture plate 14 with its caul plate 18 and heating strips 22. Next, the top fixture plate 15, with its caul plate 16, heating strips 21, and pressure bag 37 is placed on top of honeycomb sandwich structure 17. Then sandwich 17 and brazing fixture 12 are placed in the vacuum chamber formed by enclosure 11 and the gas within the chamber is evacuated. The pressure within bag 37 is initially about twenty-nine inches of mercury. This is too much pressure for elevated temperatures, so at this point in the process, the bag 37 is partially evacuated to bring the pressure down by approximately twenty-seven inches of mercury, or to one and one-half p.s.i. absolute. Next, the heating strips 21 and 22 are energized to apply heat to faces 33, 34 in a uniform manner. Sandwich 17 is heated to brazing temperature, usually about 1710° F., and held there for approximately ten minutes. Then the sandwich is rapidly cooled by de-energizing heating strips 21, 22 and sending a refrigerant through the passages 45 of the caul plates 16, 18, and, if desired, also through the conduits 23, 24 of the brazing fixture 12. This brings the temperature of sandwich 17 to ambient within ten minutes, after which the sandwich 17 is cooled to sub-zero temperature within thirty minutes. Sandwich 17 is held at about minus 100° F. for approximately eight hours. After this, sandwich 17 is rapidly heated to a heat treating temperature of about 950° F. and held there for approximately ninety minutes to complete the heat treating cycle. Then the sandwich 17 is cooled to room temperature at a uniformly decreasing rate.

Insulation blanket 41 provides thermal insulation between heating element 21 and top fixture plate 15, while insulation blanket 42 provides thermal insulation between heating strips 22 and bottom fixture plate 14. Strips 21, 22 are electrically insulated from sandwich 17 by the thin sheets of fibrous silica 43 and 44.

The pressure within the vacuum chamber formed by enclosure 11 is reduced to 100 microns, while the pressure bag 37 is maintained at any desired differential pressure with respect to the vacuum chamber up to a full atmosphere. Caul plates 16, 18 serve to maintain the desired contour of the sandwich 17.

The advantages of the invention are numerous. For example, in brazing at a temperature of 1710° F., the temperature of brazing fixture 12 never exceeds 400° F. Expansion, distortion, and deterioration of both the brazing fixture 12 and the sandwich 17 are kept to a minimum. Further, there is no necessity to use or to have a furnace, thereby cutting appreciably the capital expenditure for the apparatus.

The amount of mass to be heated is reduced to such an extent that a standard one foot by two foot sandwich can be brazed with less than 10 kva., whereas previously proposed conventional furnace brazing which requires graphite fixtures and a retort would use 200 kva. Accordingly, power costs are reduced.

Since the temperature of pressure bag 37 never exceeds 400° F., it is long lasting and does not require frequent replacement.

Both plates 14, 15 of brazing fixture 12 and the caul plates 16, 18 are water or refrigerant cooled to reduce the cooling cycle time, and to complete the deep-freeze and aging portion of the heat treating cycle without removing sandwich 17 from fixture 12 and without removing brazing fixture 12 from the vacuum chamber formed by enclosure 11. This system thus lends itself to complete programmed automation.

The apparatus of the present invention does not require the use of argon, therefore eliminating the cost of the argon and its control problems.

Maintaining the vacuum within enclosure 11 acts to remove any gases produced by the heating of the sandwich 17, or any of the elements of the brazing fixture 12, and also removes any residual contaminants.

The apparatus of this invention produces sandwich structures of any desired shape, such as flat, curved, or tapered, and produces sandwich structures which exceed the current size requirements. Additionally, because of the small amount of mass to be heated and cooled, the cycle time is considerably reduced. Further, uniform temperature is maintained on sandwich structure 17 even though it may contain edge members or inserts. This is done by controlling the placement, the current flow, and the resistance of the individual Nichrome heating strips 21, 22.

The apparatus of the present invention is extremely flexible. The small amount of mass to be heated provides for rapid heating, and thus gives maximum flexibility to this portion of the brazing, heat treating, and aging cycles. The small amount of mass to be heated also provides for rapid cooling through forced cooling introduced into the caul plates 16 and 18.

It has been found that honeycomb sandwich structure 17 made in accordance with this invention has uniform filleting, complete core bonding, and no intergranular penetration. Waviness and indentations have been .003" or less, and the bow has been less than .020".

It is to be noted that brazing fixture 12 is thermally insulated for maintaining its temperature at not more than 400° F. so that it can be made of an inexpensive, rigid material.

It is to be understood that the form of the invention herewith shown and described is to be taken as a preferred embodiment. Various changes may be made in the shape, size, and arrangement of parts. For example, equivalent elements may be substituted for those illustrated and described herein, parts may be reversed, and certain features of the invention may be utilized independently of the use of other features, all without departing from the spirit or scope of the invention as defined in the subjoined claims.

Having thus described my invention, I claim:

1. Apparatus for brazing honeycomb sandwich structures, said apparatus comprising an open brazing fixture having top and bottom fixture plates for receiving therebetween a honeycomb sandwich structure comprising a metal honeycomb core between two thin metal sheets; and a vacuum chamber for receiving said brazing fixture and honeycomb sandwich structure, said brazing fixture including flat-surfaced cooling plates and flat strip heating elements positioned between said honeycomb sandwich structure and said top and bottom fixture plates; means for evacuating said chamber to form substantially a vacuum therein; a flexible metal pressure bag positioned immediately beneath said top fixture plate for maintaining a controlled positive pressure on said honeycomb sandwich structure sufficient to clamp said sandwich structure without crushing the core thereof; electrical means for generating high temperature heat in said heating elements for brazing said honeycomb structure; and means for passing refrigerant coolant through said coolant plates for rapidly cooling said honeycomb sandwich structure.

2. Apparatus for brazing and heat treating stainless steel honeycomb sandwich structures comprising: an open brazing fixture having a pair of spaced-apart fixture plates adapted for receiving said sandwich structure therebetween; a flexible metal pressure bag between one of said fixture plates and said sandwich structure; electrical heating elements positioned between each of said fixture plates and said sandwich structure for applying heat substantially uniformly to both faces of said sandwich structure and adapted for heating said sandwich structure to a high brazing temperature of the order of 1700° F.; heat insulating means between each of said fixture plates and said heating elements for maintaining said fixture plates at a maximum temperature of the order of 400° F.; coolant plates positioned between each of said fixture plates and said honeycomb sandwich structure for receiving refrigerant coolant and adapted for reducing rapidly the temperature of said sandwich structure from said high brazing temperature; a vacuum chamber for receiving said fixture containing said sandwich structure; and means for substantially completely evacuating said chamber to about 100 microns while at the same time maintaining a differential pressure in said pressure bag to maintain the pressure on said sandwich structure at substantially less than 14.7 pounds per square inch.

3. Apparatus for brazing stainless steel structures, said structure comprising a stainless steel honeycomb core between two thin stainless steel sheets; a brazing fixture open at both ends and at both sides and having spaced-apart top and bottom fixture plates; cooling plates and heating elements positioned between said honeycomb sandwich structure and said top and bottom fixture plates; a flexible stainless steel pressure bag positioned immediately beneath said top fixture plate; a vacuum chamber for receiving said brazing fixture; means for evacuating said chamber to about 100 microns while controlling the pressure in said pressure bag for maintaining a controlled positive pressure on said honeycomb sandwich structure sufficient to clamp said sandwich structure without crushing the core thereof; electrical means for generating high temperature heat of about 1700° F. in said heating elements for brazing said honeycomb structure; and means for passing refrigerant coolant through said coolant plates for rapidly cooling said honeycomb sandwich structure.

References Cited in the file of this patent

UNITED STATES PATENTS

| | | |
|---|---|---|
| 853,351 | Fulton | May 14, 1907 |
| 2,693,636 | Simpelaar | Nov. 9, 1954 |
| 2,984,732 | Herbert | May 16, 1961 |